(12) United States Patent
Maurer

(10) Patent No.: US 9,283,853 B2
(45) Date of Patent: Mar. 15, 2016

(54) HYBRID DRIVE OF A HYBRID VEHICLE

(75) Inventor: Jens Maurer, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 928 days.

(21) Appl. No.: 13/517,135

(22) PCT Filed: Nov. 20, 2010

(86) PCT No.: PCT/EP2010/007050
§ 371 (c)(1),
(2), (4) Date: Jun. 19, 2012

(87) PCT Pub. No.: WO2011/082733
PCT Pub. Date: Jul. 14, 2011

(65) Prior Publication Data
US 2012/0256481 A1    Oct. 11, 2012

(30) Foreign Application Priority Data

Jan. 11, 2010 (DE) .......................... 10 2010 004 712

(51) Int. Cl.
| | |
|---|---|
| *B60L 1/00* | (2006.01) |
| *B60L 3/04* | (2006.01) |
| *B60L 3/00* | (2006.01) |
| *B60L 11/12* | (2006.01) |
| *B60L 11/14* | (2006.01) |
| B60K 6/20 | (2007.10) |

(52) U.S. Cl.
CPC ................ *B60L 3/04* (2013.01); *B60L 3/0069* (2013.01); *B60L 11/123* (2013.01); *B60L 11/14* (2013.01); B60K 6/20 (2013.01); Y02T 10/6217 (2013.01); Y02T 10/7077 (2013.01)

(58) Field of Classification Search
CPC ............. H01R 2201/00; H01R 220/26; Y02T 10/70771; Y02T 10/6217; Y02T 10/7077; B60L 3/04; B60L 3/0069; B60L 11/14; B60L 11/123; B60K 6/20
USPC .............. 307/9.1, 10.1, 112, 113, 116, 132 E; 439/923
See application file for complete search history.

(56) References Cited

U.S. PATENT DOCUMENTS

| | | | |
|---|---|---|---|
| 5,069,634 A | 12/1991 | Chiarolanzio | |
| 7,084,361 B1 * | 8/2006 | Bowes et al. ............... | 200/16 R |
| 7,402,068 B1 * | 7/2008 | Tarchinski ................... | 439/350 |
| 2010/0156172 A1 * | 6/2010 | Pugsley et al. ................ | 307/9.1 |
| 2010/0240492 A1 * | 9/2010 | Vyas et al. ........................ | 477/3 |

FOREIGN PATENT DOCUMENTS

DE    10 2006 050 180    4/2008

* cited by examiner

*Primary Examiner* — Daniel Cavallari
(74) *Attorney, Agent, or Firm* — Gerald E. Hespos; Michael J. Porco; Matthew T. Hespos

(57) ABSTRACT

A hybrid drive of a hybrid vehicle has an internal combustion engine (10), at least one electrical machine (11, 12) and an electrical energy storage (13) that can be discharged when the electrical machine is operated as a motor, and can be charged when the electrical machine is operated as a generator. Each electrical machine (11, 12) has a converter (15, 16) coupled to the respective electrical machine (1, 12) by a plug connection (19, 20), and the electrical energy storage (13) has a converter (14) coupled to the converter (15, 16) of the electrical machine (11, 12) by a plug connection (18). The plug connections (18, 19, 20) are connected firs in a high-voltage circuit and second in a protective circuit. The plug connections (18, 19, 20) are automatically disconnected from the high voltage when the protective circuit is interrupted.

8 Claims, 1 Drawing Sheet

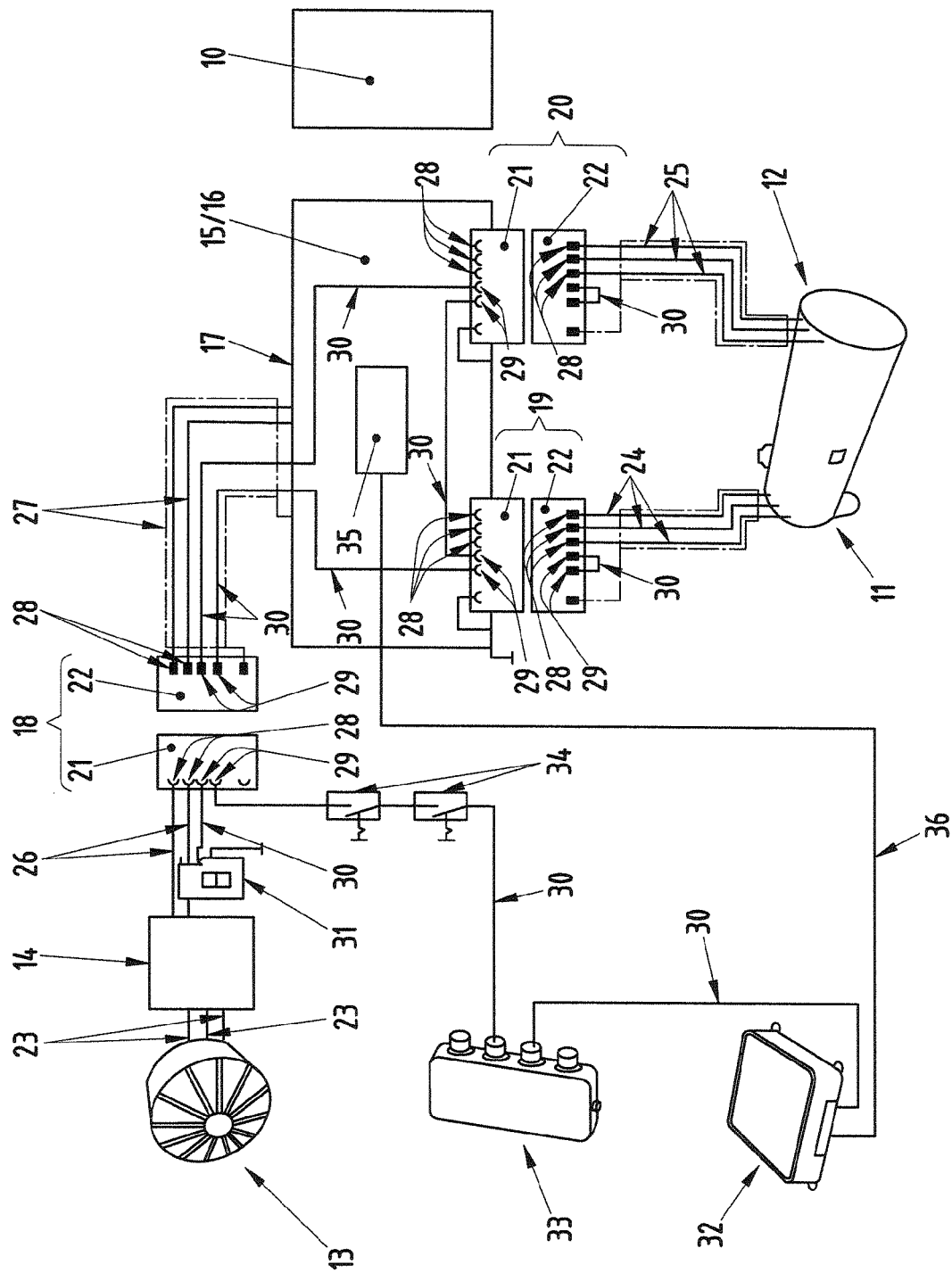

HYBRID DRIVE OF A HYBRID VEHICLE

BACKGROUND OF THE INVENTION

1. Field of the Invention

The invention relates to a hybrid drive of a hybrid vehicle.

2. Description of the Related Art

Motor vehicles having a hybrid drive are known in the field. A hybrid drive has, in addition to an internal combustion engine, at least one electrical machine which can be operated as a generator or as a motor. An electrical energy storage means interacts with the or each electrical machine, said electrical energy storage means being discharged to a relatively great extent when the or each electrical machine is operated as a motor, and being charged to a relatively great extent when the or each electrical machine is operated as a generator. The electrical energy storage means of a hybrid vehicle has an associated converter. Furthermore, the or each electrical machine in each case has an associated converter.

The converter which is associated with and interacts with the electrical energy storage means is coupled to the or each converter of the or each electrical machine by means of a plug connection. The or each converter of the or each electrical machine is likewise coupled to the respective electrical machine by means of a plug connection. These plug connections are electrical plug connections by means of which voltages of several hundred volts have to be transmitted.

It also has to be possible to have access to the abovementioned plug connections when servicing or maintenance work is carried out on the hybrid drive. In this case, it is important that a person with access to the plug connections is not put at risk due to high voltages when carrying out maintenance or servicing work. Hybrid drives with which this can be ensured in a simple and reliable manner have not been disclosed to date.

Proceeding from the above, the present invention is based on the problem of providing a novel hybrid drive of a hybrid vehicle.

SUMMARY OF THE INVENTION

According to the invention, the plug connections are connected firstly in at least one high-voltage circuit and secondly in a protective circuit, with the plug connections being automatically disconnected from the high voltage when the protective circuit is interrupted.

Within the context of the present invention, it is proposed that the plug connections, specifically firstly the plug connection by means of which the converter of the electrical energy storage means is coupled to the or each converter of the or each electrical machine, and secondly the or each plug connection which serves to couple the or each converter of the or each electrical machine to the respective electrical machine, are connected both in at least one high-voltage circuit and in a protective circuit. The plug connections are automatically disconnected from the high voltage when the protective circuit is interrupted. As a result, simple means can be used to reliably prevent a person accessing the plug connections for the purpose of maintenance or servicing work being at risk due to high voltages of several hundred volts.

The or each high-voltage circuit preferably comprises a high-voltage switch which is connected between the converter of the electrical energy storage means and that plug connection by means of which the converter of the electrical energy storage means is coupled to the or each converter of the or each electrical machine, with the high-voltage switch only being closed and a high voltage only being provided to the plug connections when the protective circuit is closed, and with the high-voltage switch automatically opening and automatically disconnecting the high voltage from the plug connections when the protective circuit is interrupted.

According to an advantageous development of the invention, each of the plug connections has in each case two plug connector halves with a plurality of connections which can make contact with one another, specifically with high-voltage connections and protective circuit connections, with the protective circuit connections being shorter than the high-voltage connections, with the result that the protective circuit connections are disconnected before the high-voltage connections when a plug connection is disconnected.

The situation of the protective circuit connections of the plug connector halves of the plug connections being shorter than the high-voltage connections of said plug connections ensures that, when a closed plug connection is accessed in order to open said plug connection, initially the protective circuit connections are disconnected, and only then the high-voltage connections. When an opened plug connection is accessed in order to close said plug connection, the protective circuit connections are connected only after the high-voltage connections. As a result, it is possible to ensure that a high voltage is provided to the high-voltage connections of plug connector halves of a plug connection only when the plug connector halves of the plug connection are closed to such an extent that contact is made with both the high-voltage connections and also the protective circuit connections of the plug connector halves.

Preferred developments of the invention can be found in the dependent claims and the following description. Exemplary embodiments of the invention will be explained in greater detail, without the invention being restricted to these exemplary embodiments, with reference to the drawing.

BRIEF DESCRIPTION OF THE DRAWING

FIG. 1 shows a block circuit diagram of an exemplary embodiment of a hybrid drive according to the invention.

DETAILED DESCRIPTION OF THE PREFERRED EMBODIMENT

The present invention relates to a hybrid drive of a hybrid vehicle.

FIG. 1 shows a schematic illustration of an exemplary embodiment of a hybrid drive according to the invention of a hybrid vehicle, with the hybrid drive of the exemplary embodiment of FIG. 1 comprising an internal combustion engine 10, two electrical machines 11 and 12 and an electrical energy storage means 13. The number of electrical machines can vary. Therefore, the hybrid drive can also comprise only one electrical machine.

The electrical energy storage means 13 is discharged to a relatively great extent by the electrical machines 11 and 12 of the hybrid drive when said electrical machines are operated as motors. In contrast, the electrical energy storage means 13 can be charged to a relatively great extent by the electrical machines 11 and 12 when said electrical machines are operated as generators.

The electrical energy storage means 13 has an associated converter 14. Furthermore, each electrical machine 11 and 12 in each case has an associated converter 15 and, respectively, 16, these converters being combined in FIG. 1 to form a converter unit 17.

The converter 14, which is associated with the electrical energy storage means 13 or interacts with said electrical energy storage means, is coupled to the converter unit 17, and therefore to the two converters 15, 16 of the electrical machines 11 and 12, by means of a plug connection 18. The converters 15, 16 which interact with the electrical machines 11 and 12 and are associated with said electrical machines are coupled to the electrical machines 11, 12 by means of plug connections 19 and 20. These plug connections 18, 19 and 20 are electrical plug connections by means of which high voltages of several hundred volts have to be transmitted between the electrical energy storage means 13 and the electrical machines 11 and 12 of the hybrid drive.

The plug connections 18, 19 and 20 are in each case formed by two plug connector halves 21 and 22. The two plug connector halves 21 and 22 of the plug connector 18 are connected when the converter 14 of the electrical energy storage means 13 is coupled to the converters 15, 16 of the electrical machines 11 and 12. In contrast, the two plug connector halves 21, 22 of the plug connection 18 are disconnected when the converter 14 of the electrical energy storage means 13 is uncoupled from the converters 15, 16 of the electrical machines 11, 12. Each of the electrical machines 11 and 12 can be coupled to its converter 15 or 16 and disconnected from said converter in an analogous manner by connecting and, respectively, disconnecting the plug connector halves 21 and 22 of the plug connections 19 and 20.

As already discussed, high voltages of several hundred volts are transmitted between the electrical energy storage means 13 and the electrical machines 11 and 12 and therefore by means of the converters 14, 15 and 16 and plug connections 18, 19 and 20. Therefore, it can be seen in FIG. 1 that three high-voltage lines 23 run between the electrical energy storage means 13 and the converter 14 which interacts with said electrical energy storage means, it being possible for three-phase alternating current to be transmitted between the electrical energy storage means 13 and the converter 14 by means of said high-voltage lines.

Similarly, in each case three high-voltage lines 24 and 25 run between the plug connections 19 and 20, specifically the plug connector halves 22 of said plug connections, and the electrical machines 11 and 12, it likewise being possible for three-phase alternating current to be transmitted by means of said high-voltage lines.

In contrast, in each case two high-voltage lines 26 and 27 run between the converter 14 of the electrical machine 13 and the plug connection 18, specifically the plug connector half 21 of said plug connection, and between the converters 15, 16 of the electrical machines 11 and 12 and the plug connection 18, specifically the plug connector half 22 of said plug connection, it being possible for two-phase direct current to be transmitted by means of said high-voltage lines.

For the purpose of connecting these high-voltage lines 26, 27, 24 and 25 to the respective plug connector halves 21 and, respectively, 22 of the respective plug connections 18, 19 and 20, said high-voltage lines comprised high-voltage connections 28.

As already mentioned, high voltages of several hundred volts have to be transmitted by means of the plug connections 18, 19 and 20. In order to prevent a person working on a hybrid drive being at risk due to high voltage, the plug connections 18, 19 and 20 are, according to the invention, connected not only in the high-voltage circuits and high-voltage lines 26, 27, 24 and 25, by means of which high voltages can be transmitted between the electrical energy storage means 13 and the electrical machines 11 and 12, but rather additionally in a protective circuit, with the plug connections 18, 19 and 20 being automatically disconnected from the high voltage when the protective circuit is interrupted.

Accordingly, if a person working on a hybrid drive accesses a plug connection 18, 19 or 20, the invention ensures that the plug connections 18, 19 and 20 are disconnected from the high voltage, and therefore there is no risk of a person who is accessing a plug connection 18, 19 or 20 being put at risk due to high voltage.

In order to incorporate the plug connections 18, 19 and 20 in the protective circuit, said plug connections have, in addition to the high-voltage connections 28, protective circuit connections 29. By way of example, FIG. 1 shows that each plug connector half 21 or 22 of the plug connections 18, 19 and 20 in each case has two protective circuit connections 29. Protective circuit lines 30 are connected to these protective circuit connections 29 in order to form the protective circuit.

According to FIG. 1, a protective circuit line 30, which is connected to a high-voltage switch 31, engages at a first protective circuit connection 29 of the plug connector half 21 of the plug connection 18, with the high-voltage switch 31 also being coupled to one of the high-voltage lines 26.

A hybrid management system controller 32 engages at the other protective circuit connection 29 of this plug connector half 21 of the plug connection 18 by means of a protective circuit line 30, specifically with the interposition of an on-board electrical system controller 33 and with the interposition of two circuit breakers 34. One of the circuit breakers 34 is preferably a key-operated switch.

The protective circuit connections 29 of the plug connector half 22 of the plug connection 18 are connected to protective circuit connections 29 of the plug connector halves 21 of the two plug connections 19 and 20 by means of protective circuit lines 30, specifically in such a way that a first protective circuit connection 29 of the plug connector half 22 of the plug connection 18 is connected to a protective circuit connection 29 of the plug connector half 21 of the plug connection 19, and a second protective circuit connection 29 of the plug connector half 22 of the plug connection 18 is connected to a protective circuit connection 29 of the plug connector half 21 of the plug connection 20.

The two other protective circuit connections 29 of these plug connector halves 21 of the two plug connectors 19 and 20 are connected in the manner of a bridge by a protective circuit line 30.

The two protective circuit connections 29 of the plug connector halves 22 are in each case connected and, respectively, short-circuited by means of a protective circuit line 30 in the region of the plug connector halves 22 of the two plug connections 19 and 20.

The high-voltage switch 31 can be closed, in order to provide a high voltage to the plug connections 18, 19 and 20, by providing a corresponding signal by means of the hybrid management system controller 32 only when the protective circuit which is provided in the above manner is closed.

If, in contrast, the protective circuit is opened, specifically either by opening a plug connection 18, 19 or 20 and/or by opening a circuit breaker 34 and/or by corresponding influencing by means of the on-board electrical system controller 33 or the hybrid management system controller 32, the high-voltage switch 31 is automatically opened and the plug connections 18, 19 and 20 are automatically disconnected from the high voltage.

The high-voltage switch 31 is preferably a high-voltage relay which, as already mentioned, is associated with the converter 14 of the electrical energy storage means 13 and is connected between the converter 14 of the electrical energy storage means 13 and the plug connection 18 by means of which the converter 14 of the electrical energy storage means 13 is coupled to the converters 15, 16 of the electrical machines 11, 12.

When, for example, a circuit breaker 34 is opened, the protective circuit is opened and the high-voltage switch 31 is automatically opened, and therefore no high voltage is then present at the plug connections 18, 19 and 20.

If one of the plug connections 18, 19 and 20 is accessed and one of these plug connections 18, 19 or 20 is disconnected, the protective circuit is likewise opened, with the high-voltage switch 31 then automatically opening and disconnecting all the plug connections 18, 19 and 20 from the high voltage.

The protective circuit connections 29 which are associated with the plug connector halves 21 and 22 of the plug connections 18, 19 and 20 are preferably shorter than the high-voltage connections 28. This ensures that the protective circuit connections 29 are disconnected before the high-voltage connections 28 when a plug connection 18, 19 or 20 is disconnected, with the result that the protective circuit is accordingly interrupted and the high-voltage connections 28 are disconnected from the high voltage before the high-voltage connections 28 are disconnected and accessible. Conversely, when plug connector halves 21 and 22 are connected to one another, the protective circuit connections 29 make contact only after the high-voltage connections 28, and therefore there is no risk of high-voltage connections 28 to which high voltage is connected being accessible, even when plug connector halves 21 and 22 of a plug connection 18, 19 and 20 are connected to one another.

According to an advantageous development of the invention, an insulation monitor 35 is associated with the converter unit 17 which comprises the two converters 15 and 16 of the two electrical machines 11 and 12, said insulation monitor being coupled to the hybrid management system controller 32 by means of a line 36. The insulation monitor 35 can be used to monitor whether there is an insulation fault in a high-voltage circuit. If the insulation monitor 35 identifies the presence of an insulation fault, said insulation monitor transmits a corresponding signal to the hybrid management system controller 32, which then automatically provides a signal for automatically opening the high-voltage switch 31 to said high-voltage switch by means of the protective circuit line 30, so that the high-voltage switch 31 then automatically opens when there is an insulation fault, so that a high voltage can no longer be transmitted in the direction of the electrical machines 11 and 12 by the electrical energy storage means 13.

The present invention accordingly proposes a hybrid drive with a safety concept which can ensure that danger caused by high voltages can be precluded. High voltage can be transmitted in the direction of the electrical machines 11 and 12 by the electrical energy storage means 13, and vice versa, when a protective circuit is closed and also a high-voltage switch 31 is closed. If, in contrast, the high-voltage switch 31 and/or the protective circuit are/is opened, the transmission of high voltage from the electrical energy storage means 13 in the direction of the electric motors 11 and 12 is automatically interrupted.

The safety concept proposed according to the invention has been presented for a hybrid drive of a hybrid vehicle. It goes without saying that this safety concept can also be used for a pure electric vehicle which is driven by one or more electrical machines. The presented advantages are retained in this case.

The invention claimed is:

1. A hybrid drive of a hybrid vehicle, comprising: an internal combustion engine, at least one electrical machine and an electrical energy storage means which can be discharged to a relatively great extent when the at least one electrical machine is operated as a motor, and can be charged to a relatively great extent when the at least one electrical machine is operated as a generator, with the at least one electrical machine having an associated converter coupled to the respective electrical machine by a plug connection, and the electrical energy storage means having an associated converter coupled to the respective converter of the at least one electrical machine by a plug connection, the plug connections being connected in at least one high-voltage circuit and in a protective circuit, with the plug connections being automatically disconnected from the high voltage when the protective circuit is interrupted, the at least one high-voltage circuit comprises a high-voltage switch, the high-voltage switch only being closed and a high voltage only being provided to the plug connections when the protective circuit is closed, and with the high-voltage switch automatically opening and automatically disconnecting the high voltage from the plug connections when the protective circuit is interrupted, and a hybrid management system controller coupled to the plug connection, that couples the converter of the electrical energy storage means to the converter of the at least one electrical machine via at least one circuit breaker and an on-board electrical system controller, wherein a signal for closing the high-voltage switch can be provided to said high-voltage switch by said hybrid management system controller when the protective circuit is closed.

2. The hybrid drive as claimed in claim 1, wherein the high-voltage switch is a high-voltage relay and is associated with the converter of the electrical energy storage means.

3. The hybrid drive as claimed in claim 1, wherein the high-voltage switch is connected between the converter of the electrical energy storage means and the plug connection that couples the converter of the electrical energy storage means to the converter of the at least one electrical machine.

4. The hybrid drive as claimed in claim 1, wherein each of the plug connections has two plug connector halves with a plurality of connections that can make contact with one another, the plurality of connections including high-voltage connections and protective circuit connections, the protective circuit connections being shorter than the high-voltage connections so that the protective circuit connections are disconnected before the high-voltage connections when a plug connection is disconnected.

5. The hybrid drive as claimed in claim 1, wherein said hybrid drive has a plurality of electrical machines, each of the electrical machines having an associated converter, the converters of the electrical machines being coupled to the converter of the electrical energy storage means by a common plug connection and being coupled to the respective electrical machine by separate plug connections.

6. The hybrid drive as claimed in claim 5, wherein protective circuit connections of the plug connections that couple the converters of the electrical machines to the respective electrical machine are directly connected to one another to form the protective circuit.

7. The hybrid drive as claimed in claim 6, wherein the protective circuit connections of plug connector halves of different plug connections and the protective circuit connections of the same plug connector halves of the same plug connections are directly connected to one another.

8. A hybrid drive of a hybrid vehicle, comprising: an internal combustion engine, at least one electrical machine and an electrical energy storage means which can be discharged to a relatively great extent when the at least one electrical machine is operated as a motor, and can be charged to a relatively great extent when the at least one electrical machine is operated as a generator, with the at least one electrical machine having an associated converter coupled to the respective electrical machine by a plug connection, and the electrical energy storage means having an associated converter coupled to the respective converter of the at least one electrical machine by a plug connection, the plug connections being connected in at least one high-voltage circuit and in a protective circuit, with the plug connections being automatically disconnected from the high voltage when the protective circuit is interrupted, the at least one high-voltage circuit comprises a high-voltage switch, the high-voltage switch only being closed and a high voltage only being provided to the plug connections when the protective circuit is closed, and with the high-voltage switch automatically opening and automatically disconnecting the high voltage from the plug connections when the protective circuit is interrupted, and an insulation monitor coupled to the converter of the at least one electrical machine, the high-voltage switch automatically opening when the insulation monitor identifies an insulation fault in a high-voltage circuit.

* * * * *